US012294852B2

United States Patent
Jot et al.

(10) Patent No.: US 12,294,852 B2
(45) Date of Patent: *May 6, 2025

(54) SPATIAL AUDIO FOR INTERACTIVE AUDIO ENVIRONMENTS

(71) Applicant: Magic Leap, Inc., Plantation, FL (US)

(72) Inventors: Jean-Marc Jot, Aptos, CA (US); Samuel Charles Dicker, San Francisco, CA (US); Brian Lloyd Schmidt, Bellevue, WA (US); Remi Samuel Audfray, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,289

(22) Filed: Sep. 5, 2023

(65) Prior Publication Data

US 2023/0413007 A1 Dec. 21, 2023

Related U.S. Application Data

(63) Continuation of application No. 17/092,060, filed on Nov. 6, 2020, now Pat. No. 11,792,598, which is a
(Continued)

(51) Int. Cl.
*H04S 7/00* (2006.01)
*G02B 27/01* (2006.01)
(Continued)

(52) U.S. Cl.
CPC ............ *H04S 7/304* (2013.01); *G02B 27/017* (2013.01); *G10K 15/10* (2013.01); *H04R 3/04* (2013.01);
(Continued)

(58) Field of Classification Search
None
See application file for complete search history.

(56) References Cited

U.S. PATENT DOCUMENTS

| 4,852,988 A | 8/1989 | Velez |
| 5,436,975 A | 7/1995 | Lowe et al. |

(Continued)

FOREIGN PATENT DOCUMENTS

| CA | 2316473 A1 | 1/2001 |
| CA | 2362895 A1 | 12/2002 |

(Continued)

OTHER PUBLICATIONS

Non-Final Office Action mailed Apr. 23, 2024, for U.S. Appl. No. 18/449,624, filed Aug. 14, 2023, nine pages.
(Continued)

*Primary Examiner* — James K Mooney
(74) *Attorney, Agent, or Firm* — Morrison & Foerster LLP

(57) ABSTRACT

Systems and methods of presenting an output audio signal to a listener located at a first location in a virtual environment are disclosed. According to embodiments of a method, an input audio signal is received. For each sound source of a plurality of sound sources in the virtual environment, a respective first intermediate audio signal corresponding to the input audio signal is determined, based on a location of the respective sound source in the virtual environment, and the respective first intermediate audio signal is associated with a first bus. For each of the sound sources of the plurality of sound sources in the virtual environment, a respective second intermediate audio signal is determined. The respective second intermediate audio signal corresponds to a reflection of the input audio signal in a surface of the virtual environment. The respective second intermediate audio signal is determined based on a location of the respective sound source, and further based on an acoustic property of the virtual environment. The respective second intermediate audio signal is associated with a second bus. The output
(Continued)

audio signal is presented to the listener via the first bus and the second bus.

20 Claims, 18 Drawing Sheets

Related U.S. Application Data continuation of application No. 16/445,171, filed on Jun. 18, 2019, now Pat. No. 10,863,300.

(60) Provisional application No. 62/686,655, filed on Jun. 18, 2018, provisional application No. 62/686,665, filed on Jun. 18, 2018.

(51) Int. Cl.
| | | |
|---|---|---|
| *G10K 15/10* | (2006.01) | |
| *H04R 3/04* | (2006.01) | |
| *H04R 3/12* | (2006.01) | |
| *H04R 5/033* | (2006.01) | |
| *H04R 5/04* | (2006.01) | |
| *H04S 3/00* | (2006.01) | |

(52) U.S. Cl.
CPC ............ *H04R 3/12* (2013.01); *H04R 5/033* (2013.01); *H04R 5/04* (2013.01); *H04S 3/008* (2013.01); *H04S 7/305* (2013.01); *G02B 2027/0178* (2013.01); *H04R 2499/15* (2013.01); *H04S 2400/01* (2013.01); *H04S 2400/13* (2013.01); *H04S 2400/15* (2013.01); *H04S 2420/11* (2013.01)

(56) References Cited

U.S. PATENT DOCUMENTS

| | | |
|---|---|---|
| 5,812,674 A | 9/1998 | Jot |
| 6,188,769 B1 | 2/2001 | Jot |
| 6,433,760 B1 | 8/2002 | Vaissie |
| 6,491,391 B1 | 12/2002 | Blum et al. |
| 6,847,336 B1 | 1/2005 | Lemelson |
| 6,943,754 B2 | 9/2005 | Aughey |
| 6,977,776 B2 | 12/2005 | Volkenandt et al. |
| 7,099,482 B1 | 8/2006 | Jot |
| 7,347,551 B2 | 3/2008 | Fergason et al. |
| 7,488,294 B2 | 2/2009 | Torch |
| 7,561,699 B2 | 7/2009 | Jot |
| 8,235,529 B1 | 8/2012 | Raffle |
| 8,611,015 B2 | 12/2013 | Wheeler |
| 8,638,498 B2 | 1/2014 | Bohn et al. |
| 8,696,113 B2 | 4/2014 | Lewis |
| 8,929,589 B2 | 1/2015 | Publicover et al. |
| 9,010,929 B2 | 4/2015 | Lewis |
| 9,274,338 B2 | 3/2016 | Robbins et al. |
| 9,292,973 B2 | 3/2016 | Bar-Zeev et al. |
| 9,323,325 B2 | 4/2016 | Perez et al. |
| 9,530,421 B2 | 12/2016 | Jot |
| 9,720,505 B2 | 8/2017 | Gribetz et al. |
| 10,013,053 B2 | 7/2018 | Cederlund et al. |
| 10,025,379 B2 | 7/2018 | Drake et al. |
| 10,038,967 B2 | 7/2018 | Jot |
| 10,735,884 B2 | 8/2020 | Audfray et al. |
| 10,863,300 B2 | 12/2020 | Jot et al. |
| 10,952,010 B2 | 3/2021 | Audfray et al. |
| 11,032,662 B2 | 6/2021 | Sarkar |
| 11,570,570 B2 | 1/2023 | Audfray et al. |
| 11,770,671 B2 | 9/2023 | Audfray et al. |
| 11,792,598 B2 | 10/2023 | Jot et al. |
| 12,156,016 B2 | 11/2024 | Audfray |
| 2003/0030597 A1 | 2/2003 | Geist |
| 2006/0023158 A1 | 2/2006 | Howell et al. |
| 2010/0033427 A1 | 2/2010 | Marks |
| 2011/0211056 A1 | 9/2011 | Publicover et al. |
| 2011/0213664 A1 | 9/2011 | Osterhout |
| 2012/0021806 A1 | 1/2012 | Maltz |
| 2012/0093320 A1 | 4/2012 | Flaks |
| 2013/0077147 A1 | 3/2013 | Efimov |
| 2013/0170679 A1 | 7/2013 | Nystrom |
| 2014/0195918 A1 | 7/2014 | Friedlander |
| 2015/0168731 A1 | 6/2015 | Robbins |
| 2016/0212272 A1 | 7/2016 | Srinivasan |
| 2016/0372123 A1 | 12/2016 | Kjoerling |
| 2017/0013385 A1 | 1/2017 | Vautin |
| 2017/0078820 A1 | 3/2017 | Brandenburg |
| 2017/0188168 A1 | 6/2017 | Lyren |
| 2017/0223478 A1 | 8/2017 | Jot et al. |
| 2017/0345216 A1 | 11/2017 | Boyle |
| 2018/0020312 A1 | 1/2018 | Visser et al. |
| 2018/0139565 A1 | 5/2018 | Norris |
| 2018/0160251 A1 | 6/2018 | Sanger |
| 2019/0373395 A1 | 12/2019 | Sarkar |
| 2021/0152970 A1 | 5/2021 | Jot et al. |
| 2023/0121353 A1 | 4/2023 | Audfray et al. |
| 2023/0388736 A1 | 11/2023 | Audfray et al. |

FOREIGN PATENT DOCUMENTS

| | | |
|---|---|---|
| CA | 2388766 A1 | 12/2003 |
| DE | 19634155 A1 | 2/1997 |
| JP | 2017522771 A | 8/2017 |
| WO | 2018026828 A1 | 2/2018 |
| WO | 2018053047 A1 | 3/2018 |

OTHER PUBLICATIONS

European Office Action dated Nov. 22, 2023, for EP Application No. 19823750.5, four pages.
Japanese Office Action mailed Nov. 2, 2023, for JP Application No. 2020-570498, with English translation, 13 pages.
Japanese Office Action mailed Nov. 6, 2023, for JP Application No. 2020-570493, with English translation, 12 pages.
Japanese Office Action mailed Sep. 12, 2024, for JP Application No. 2023-143435, with English translation, eleven pages.
Notice of Allowance mailed Sep. 24, 2024, for U.S. Appl. No. 18/449,624, filed Aug. 14, 2023, five pages.
European Office Action dated Feb. 9, 2024, for EP Patent Application No. 19822672.2, six pages.
Chinese Notice of Allowance dated Oct. 10, 2022, for CN Application No. 201980053576.5, with English translation, four pages.
Chinese Notice of Allowance dated Sep. 23, 2022, for CN Application No. 201980053584.X, with English translation, 4 pages.
Chinese Office Action dated Jan. 18, 2022, for CN Application No. 201980053576.5, with English translation, 7 pages.
Chinese Office Action dated Jan. 7, 2022, for CN Application No. 201980053584.X, with English translation, 8 pages.
Chinese Office Action dated Jul. 13, 2022, for CN Application No. 201980053576.5, with English translation, fourteen pages.
Chinese Office Action dated Jun. 29, 2022, for CN Application No. 201980053584.X, with English translation, 12 pages.
European Search Report mailed Apr. 5, 2022, for EP Application No. 19823750.5, thirteen pages.
European Search Report mailed Mar. 3, 2022, for EP Application No. 19822672.2, fourteen pages.
Final Office Action mailed Apr. 5, 2023, for U.S. Appl. No. 17/092,060, filed Nov. 6, 2020, 14 pages.
Final Office Action mailed Sep. 6, 2022, for U.S. Appl. No. 17/175,374, filed Feb. 12, 2021, nine pages.
International Preliminary Report on Patentability mailed Dec. 30, 2020, for PCT Application No. PCT/US/2019/037818, filed Jun. 18, 2019, 5 pages.
International Preliminary Report on Patentability mailed Dec. 30, 2020, for PCT Application No. PCT/US20I9/037813, filed Jun. 18, 2019, five pages.
International Search Report mailed Sep. 5, 2019, for PCT Application No. PCT/US20I 9/037813, filed Jun. 18, 2019, three pages.
International Search Report mailed Sep. 5, 2019, for PCT Application No. PCT/US20I9/037818, filed Jun. 18, 2019, three pages.

(56) References Cited

OTHER PUBLICATIONS

Jacob, R. "Eye Tracking in Advanced Interface Design", Virtual Environments and Advanced Interface Design, Oxford University Press, Inc. (Jun. 1995).
Japanese Office Action mailed Jun. 15, 2023, for JP Application No. JP-2020-570498, with English translation, 12 pages.
Japanese Office Action mailed Jun. 16, 2023, for JP Application No. 2020-570493, with English translation, 12 pages.
Jean-Marc Jot: "Interactive 3D Audio Rendering in Flexible Playback Configurations", Signal&Information Processing Association Annual Summit and Conference (APSIPA ASC), 2012 Asia-Pacific, IEEE, Dec. 3, 2012 (Dec. 3, 2012), pp. 1-9, *the whole document*.
Non-Final Office Action mailed Apr. 20, 2020, for U.S. Appl. No. 16/445,171, filed Jun. 18, 2019, nine pages.
Non-Final Office Action mailed Dec. 14, 2022, for U.S. Appl. No. 17/092,060, filed Nov. 6, 2020 16 pages.
Non-Final Office Action mailed Jul. 28, 2020, for U.S. Appl. No. 16/905,855, filed Jun. 18, 2020, four pages.
Non-Final Office Action mailed Mar. 17, 2022, for U.S. Appl. No. 17/175,374, filed Feb. 12, 2021, five pages.
Notice of Allowance (corrected) mailed Apr. 3, 20200, for U.S. Appl. No. 16/445,163, filed Jun. 18, 2019, four pages.
Notice of Allowance mailed Aug. 7, 2020, for U.S. Appl. No. 16/445,171, filed Jun. 18, 2019, five pages.
Notice of Allowance mailed Aug. 8, 2023, for U.S. Appl. No. 17/092,060, filed Nov. 6, 2020, seven pages.
Notice of Allowance mailed Jul. 14, 2023, for U.S. Appl. No. 18/069,702, filed Dec. 21, 2022, seven pages.
Notice of Allowance mailed Mar. 25, 2020, for U.S. Appl. No. 16/445,163, filed Jun. 18, 2019, seven pages.
Notice of Allowance mailed Nov. 13, 2020, for U.S. Appl. No. 16/905,855, filed Jun. 18, 2020, seven pages.
Notice of Allowance mailed Nov. 23, 2022, for U.S. Appl. No. 17/175,374, filed Feb. 12, 2021, five pages.
Rolland, J. et al., "High- resolution inset head- mounted display", Optical Society of America, vol. 37, No. 19, Applied Optics, (Jul. 1, 1998).
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Yoshida, A. et al., "Design and Applications of a High Resolution Insert Head Mounted Display", (Jun. 1994).
Japanese Final Office Action mailed Mar. 15, 2024, for JP Application No. 2020-570493, with English translation, three pages.
Japanese Final Office Action mailed Mar. 15, 2024, for JP Application No. 2020-570498, with English translation, three pages.
Japanese Office Action mailed Oct. 23, 2024, for JP Application No. 2023-136239, with English translation, 14 pages.
Japanese Final Office Action mailed Feb. 10, 2025, for JP Application No. 2023-143435, with English translation, 14 pages.

SPATIAL AUDIO FOR INTERACTIVE AUDIO ENVIRONMENTS

CROSS-REFERENCE TO RELATED APPLICATION

This application is a continuation of U.S. Non-Provisional application Ser. No. 17/092,060, filed Nov. 6, 2020, which is a continuation of U.S. Non-Provisional application Ser. No. 16/445,171, filed on Jun. 18, 2019, now. U.S. Pat. No. 10,863,300, which claims priority to U.S. Provisional Application No. 62/686,655, filed on Jun. 18, 2018, the contents of which are incorporated by reference herein in their entirety. This application additionally claims priority to U.S. Provisional Application No. 62/686,665, filed on Jun. 18, 2018, the contents of which are incorporated by reference herein in their entirety.

FIELD

This disclosure generally relates spatial audio rendering, and specifically relates to spatial audio rendering for virtual sound sources in a virtual acoustic environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modem computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of an XR system in such a way that the sounds seem to be occurring—naturally, and consistently with the user's expectations of the sound—in the user's real environment. Generally speaking, users expect that virtual sounds will take on the acoustic properties of the real environment in which they are heard. For instance, a user of an XR system in a large concert hall will expect the virtual sounds of the XR system to have large, cavernous sonic qualities; conversely, a user in a small apartment will expect the sounds to be more dampened, close, and immediate.

Digital, or artificial, reverberators may be used in audio and music signal processing to simulate perceived effects of diffuse acoustic reverberation in rooms. In XR environments, it is desirable to use digital reverberators to realistically simulate the acoustic properties of rooms in the XR environment. Convincing simulations of such acoustic properties can lend feelings of authenticity and immersion to the XR environment.

BRIEF SUMMARY

Systems and methods of presenting an output audio signal to a listener located at a first location in a virtual environment are disclosed. According to embodiments of a method, an input audio signal is received. For each sound source of a plurality of sound sources in the virtual environment, a respective first intermediate audio signal corresponding to the input audio signal is determined, based on a location of the respective sound source in the virtual environment, and the respective first intermediate audio signal is associated with a first bus. For each of the sound sources of the plurality of sound sources in the virtual environment, a respective second intermediate audio signal is determined. The respective second intermediate audio signal corresponds to a reflection of the input audio signal in a surface of the virtual environment. The respective second intermediate audio signal is determined based on a location of the respective sound source, and further based on an acoustic property of the virtual environment. The respective second intermediate audio signal is associated with a second bus. The output audio signal is presented to the listener via the first bus and the second bus.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Example Wearable System

Figure 1:
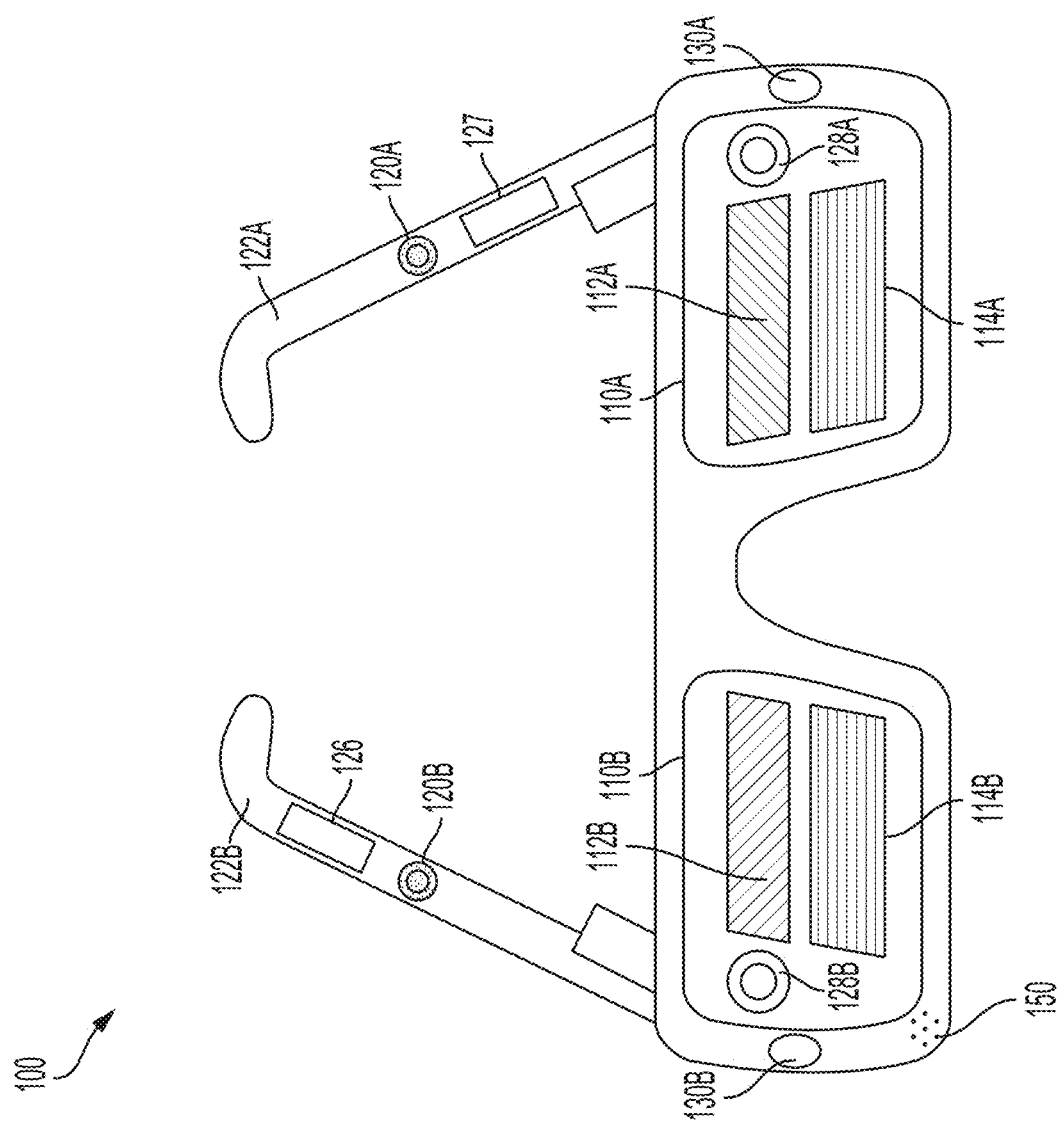
FIG. 1 illustrates an example wearable system, according to some embodiments.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMU)(e.g. IMU 126), acoustic sensors (e.g., microphone 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements) (e.g., eye cameras 128 and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned in a wearable head device adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
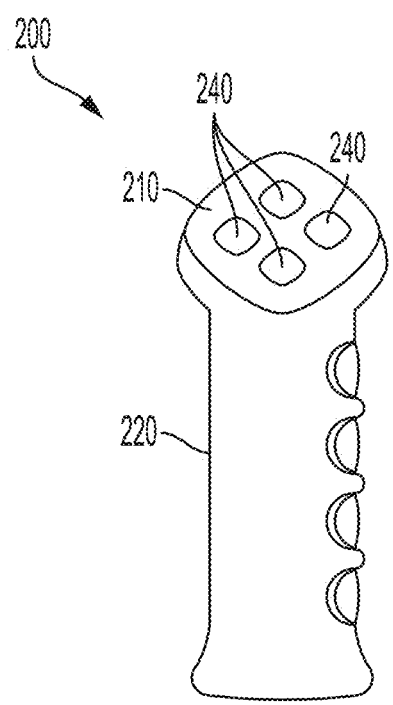
FIG. 2 illustrates an example handheld controller that can be used in conjunction with an example wearable system, according to some embodiments.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200—which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
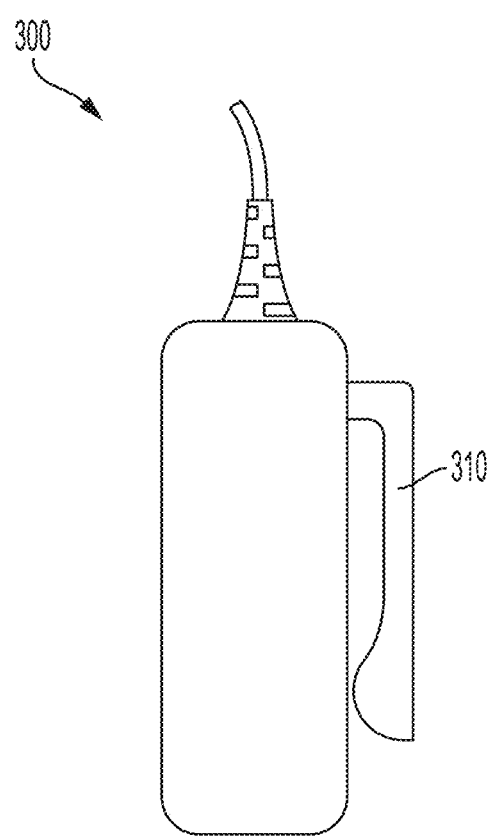
FIG. 3 illustrates an example auxiliary unit that can be used in conjunction with an example wearable system, according to some embodiments.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well-suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
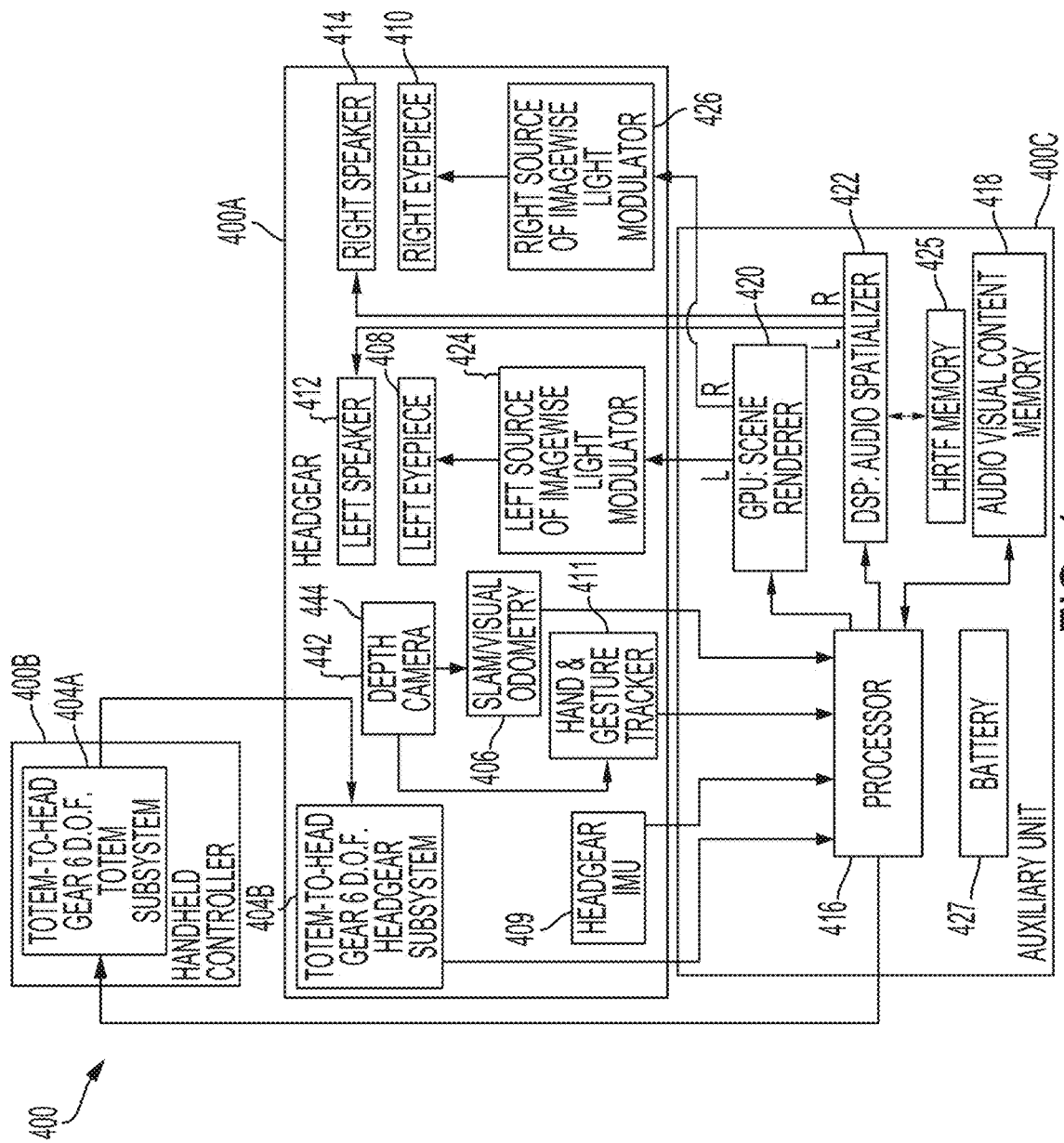
FIG. 4 illustrates an example functional block diagram for an example wearable system, according to some embodiments.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example wearable head device 400A (which may correspond to wearable headgear device 100 described above); the wearable head device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch, and roll rotations; as vectors; as a rotation matrix; as a quaternion; or as some other representation. In some examples, one or more depth cameras 444 (and/or one or more non-depth cameras) included in the wearable head device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the wearable head device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to wearable head device 400A) to an inertial coordinate space, or to an environmental coordinate space. For instance, such transformations may be necessary for a display of wearable head device 400A to present a virtual object at an expected position and orientation relative to the real environment (e.g., a virtual person sitting in a real chair, facing forward, regardless of the position and orientation of wearable head device 400A), rather than at a fixed position and orientation on the display (e.g., at the same position in the display of wearable head device 400A). This can maintain an illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the wearable head device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of wearable head device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head device 400A. The hand gesture tracker 411 can identify a user's hand gestures, for example, by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, a microphone (not shown); and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 416 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to wearable head device 400A and/or handheld controller 400B. Including such components in an auxiliary unit, which can be mounted to a user's waist, can limit the size and weight of wearable head device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with wearable head device 400A or handheld controller 400B. Furthermore, some wearable systems may forgo entirely a handheld controller 400B or auxiliary unit 400C. Such changes and modifications are to be understood as being included within the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example, in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time, based on data associated with the virtual environment and/or input provided by a user, a state of the virtual environment at a second time. For instance, if an object in the virtual environment is located at a first coordinate at time, and has certain programmed physical parameters (e.g., mass, coefficient of friction); and an input received from user indicates that a force should be applied to the object in a direction vector; the processor can apply laws of kinematics to determine a location of the object at time using basic mechanics. The processor can use any suitable information known about the virtual environment, and/or any suitable input, to determine a state of the virtual environment at a time. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

Reflections and Reverberations

Figure 5:
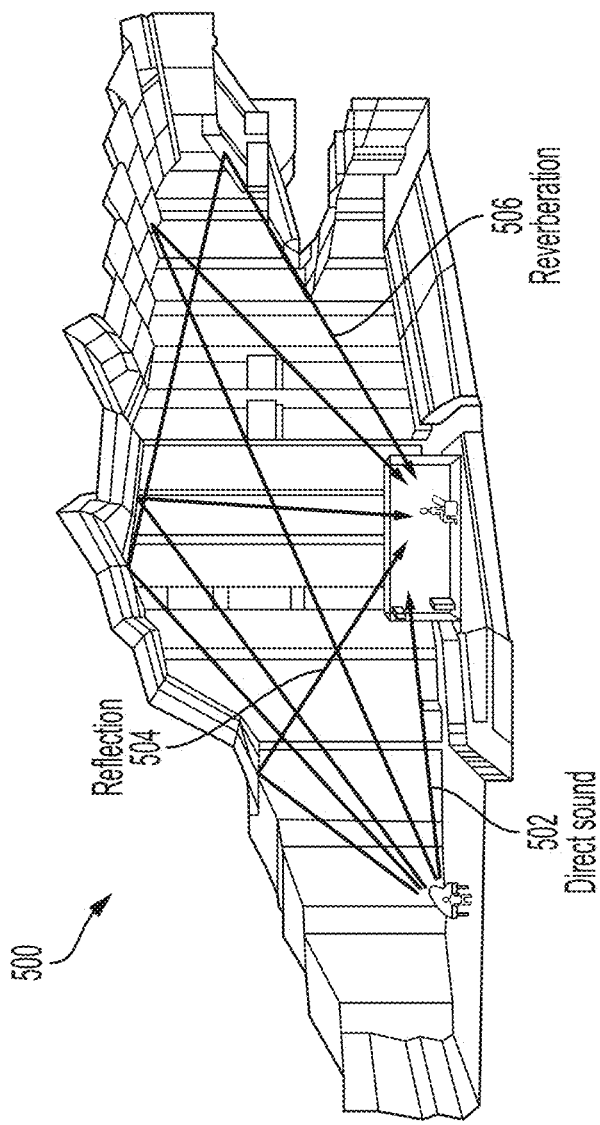
FIG. 5 illustrates an example geometrical room representation, according to some embodiments.

Aspects of a listener's audio experience in a space (e.g., a room) of a virtual environment include that listener's perception of a direct sound; the listener's perception of reflections of that direct sound against the surfaces of the room; and the listener's perception of reverberations ("reverb") of the direct sound in the room. FIG. 5 illustrates a geometrical room representation 500, according to some embodiments. The geometrical room representation 500 shows example propagation paths for direct sound (502), reflections (504), and reverberations (506). These paths represent a path that an audio signal may take from a source to a listener in the room. The room shown in FIG. 5 may be any suitable type of environment associated with one or more acoustic properties. For example, room 500 may be a concert hall and may include a stage with a piano player, and an audience seating section with an audience member. As shown, the direct sound is sound that originates at the source (e.g., the piano player) and travels directly toward the listener (e.g., the audience member). The reflections are sounds that originate at the source, reflect off a surface (e.g., a wall of the room), and travel to the listener. The reverberation is sound that includes a decaying signal that includes many reflections arriving close to one another in time.

Figure 6:
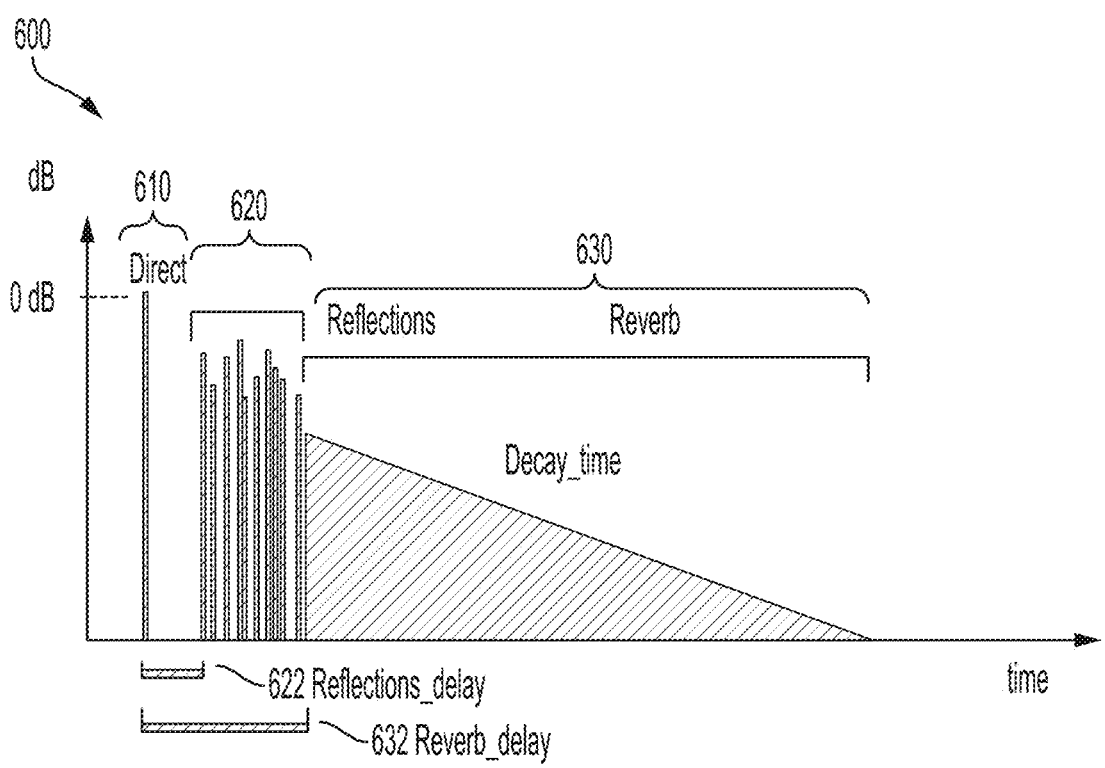
FIG. 6 illustrates an example model of a room response measured from a source to a listener in a room, according to some embodiments.

FIG. 6 illustrates an example model 600 of a room response measured from a source to a listener in a room, according to some embodiments. The model of the room response shows the amplitudes of a direct sound (610), reflections of the direct sound (620), and reverberations of the direct sound (630) from the perspective of a listener at a distance from the direct sound source. As illustrated in FIG. 6, direct sound generally arrives at the listener before the reflections (with Reflections_delay (622) in the figure indicating a difference in time between the direct sound and the reflections), which in turn arrive before the reverberations (with Reverb_delay (632) in the figure indicating a difference in time between the direct sound and the reverberations). Reflections and reverberations may be perceptually different to a listener. Reflections can be modeled separately from the reverberation, for example to better control time, attenuation, spectral shape, and direction of arrival of individual reflections. The reflections may be modeled using a reflections model and the reverberation may be modeled using a reverberation model, which may be different from the reflections model.

Reverberation properties (e.g., reverberation decays) for a same sound source may differ between two different acoustic environments (e.g., rooms) for a same sound source, and it is desirable to realistically reproduce a sound source according to the properties of a current room in a listener's virtual environment. That is, when a virtual sound source is presented in a mixed reality system, reflection and reverberation properties of a real environment of a listener should be accurately reproduced. L. Savioja, J. Huopaniemi, T. Lokki, and R. Väänänen, "Creating Interactive Virtual Acoustic Environments," J. Audio Eng. Soc. 47(9): 675-705 (1999) describes methods for reproducing a direct path, individual reflections, and acoustic reverberation in a realtime virtual 3D audio reproduction system for video games, simulations, or AR/VR. In the methods disclosed by Savioja et al., direction of arrival, delay, amplitude, and spectral equalization of each individual reflection is derived from a geometric and physical model of a room (e.g., a real room, a virtual room, or some combination thereof), which may require a complex rendering system. These methods may be computationally complex, perhaps prohibitively so for mobile applications in which computing resources may be at a premium.

In some room acoustic simulation algorithms, reverberation may be implemented by downmixing all sound sources into a mono signal, and sending the mono signal to a reverberation simulation module. Gains used for the downmixing and sending may depend on dynamic parameters such as, for example, source distance, and manual parameters such as, for example, reverberation gain.

Sound source directivity, or radiation pattern, may refer to a measure of how much energy a sound source is emitting in different directions. The sound source directivity has an effect on all parts of a room impulse response (e.g., direct, reflections, and reverberations). Different sound sources may exhibit different directivities; for example, human speech may have a different directivity pattern than a trumpet playing. Room simulation models may take sound source directivity into account when producing accurate simulations of acoustic signals. For example, a model incorporating sound source directivity may include a function of direction of line from a sound source to a listener relative to a front direction (or main acoustical axis) of the sound source. The directivity pattern is axisymmetric about a main acoustical axis of the sound source. In some embodiments, a parametric gain model may be defined using frequency depend filters. In some embodiments, in order to determine how much audio from a given sound source should be sent into a reverberation bus, a diffuse power average of the sound source may be computed (e.g., by integrating over a sphere centered about an acoustical center of the sound source).

Interactive audio engines and sound design tools may make assumptions about an acoustic system to be modelled. For example, some interactive audio engines may model sound source directivity as a function independent of frequency, which may have two potential drawbacks. First, it may ignore frequency dependent attenuation on direct sound propagation from a sound source to a listener. Second, it may ignore frequency dependent attenuation on reflections and reverberation send. These effects may be important from a psychoacoustics point of view, and not reproducing them may lead to a room simulation that is perceived as unnatural and different from what a listener is accustomed to experiencing in a real acoustic environment.

In some cases, a room simulation system or interactive audio engine may not fully separate a sound source, a listener, and acoustic environment parameters such as reflections and reverberation. Instead, the room simulation system may be tuned as a whole for a specific virtual environment, and may not adapt to different playback scenarios. For example, a reverberation in a simulated environment may not match an environment in which a user/listener is physically present when listening to rendered content.

In augmented or mixed reality applications, computer-generated audio objects may be rendered via an acoustically transparent playback system to be blended with a physical environment heard naturally by a user/listener. This may require binaural artificial reverberation processing to match local environment acoustics, so that synthetic audio objects are not discernable from sounds occurring naturally or reproduced over loudspeakers. Approaches involving measurement or calculation of room impulse responses based, for instance, on estimating a geometry of an environment may be limited in consumer environments by practical obstacles and complexity. In addition, a physical model may not necessarily provide the most compelling listening experience as it may not take into acoustic principles of psychoacoustics or offer an audio scene parametrization suitable for a sound designer to fine tune a listening experience.

Matching a few specific physical properties of a target acoustic environment may not provide a simulation that closely matches perceptually an environment of a listener or an intention of an application designer. A perceptually relevant model of the target acoustic environment that may be characterized with a practical audio environment description interface may be desired.

For example, a rendering model that separates contribution of sources, listener, and room properties may be desired. A rendering model that separates the contributions may enable adapting or swapping components at run-time according to properties of a local environment and an end user. For instance, the listener may be in a physical room that has different acoustical features than the virtual environment the content was originally created in. Modifying an early reflections and/or reverberation part of a simulation to match the listening environment may lead to a more convincing listening experience. Matching a listening environment may be particularly important in mixed reality applications where a desired effect may be that the listener cannot discern which sounds around them are simulated and which sounds are present in the real surrounding environment.

Creating a convincing effect without requiring detailed knowledge of a real surrounding environment geometry and/or acoustical properties of surrounding surfaces may be desired. Detailed knowledge of real surrounding environment properties may not be available, or they may be complex to estimate, especially on a portable device. Instead, a model based on perception and psychoacoustic principles may be a much more practical tool to characterize an acoustical environment.

Figure 7:
FIG. 7 illustrates example factors affecting a user's perception of direct sounds, reflections, and reverberations, according to some embodiments.

FIG. 7 illustrates a table 700 including some objective acoustic and geometric parameters that characterize each section in a binaural room impulse model, distinguishing properties of a source, a listener, and a room, according to some embodiments. Some source properties may be independent of how and where content will be rendered, including free-field and diffuse-field transfer functions, while other properties may need to be dynamically updated at playback time, including position and orientation. Similarly, some listener properties may be independent of where content will be rendered, including free-field and diffuse-field head-related transfer functions or diffuse-field inter-aural coherence (IACC), while other properties may be dynamically updated at playback time, including position and orientation. Some room properties, especially properties contributing to late reverberation, may be dependent entirely on the environment. A representation of the reverberation decay rate and room cubic volume may be to adapt a spatial audio rendering system to a playback environment of the listener.

A source and ear of a listener may be modelled as emitting and receiving transducers, each characterized by a set of direction-dependent free-field transfer functions, which include head-related transfer functions (HRTF) of the listener.

Figure 8:
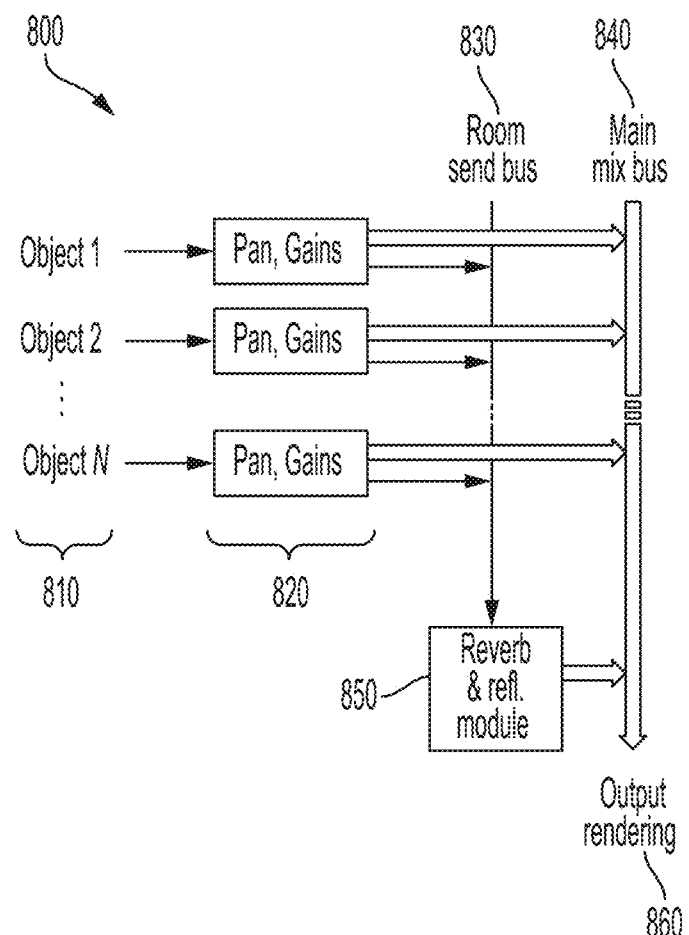
FIG. 8 illustrates an example audio mixing architecture for rendering multiple virtual sound sources in a virtual room, according to some embodiments.

FIG. 8 illustrates an example audio mixing system 800 for rendering multiple virtual sound sources in a virtual room, such as in an XR environment, according to some embodiments. For example, the audio mixing architecture may include a rendering engine for room acoustic simulation of multiple virtual sound sources 810 (i.e., objects 1 through N). The system 800 comprises a room send bus 830 feeding a module 850 (e.g., a shared reverberation and reflections module) that renders reflections and reverberation. Aspects of this general process are described, for example, in IA-SIG 3D Audio Rendering Guidelines (Level 2), www.iasig.net (1999). The room send bus combines contributions from all sources—e.g., sound sources 810, each processed by a corresponding module 820—to derive an input signal of a room module. The room send bus may comprise a mono room send bus. A format of a main mix bus 840 may be a two-channel or multi-channel format matching a final output rendering method, which may include, for example, a binaural renderer for headphone playback, an ambisonic decoder, and/or a multi-channel loudspeaker system. The main mix bus combines contributions from all sources with the room module output to derive an output rendering signal 860.

With reference to example system 800, each object of N objects may represent a virtual sound source signal and may be assigned, such by a panning algorithm, an apparent location in an environment. For example, each object can be assigned angular position on a sphere centered about a position of a virtual listener. A panning algorithm may calculate a contribution of each object to each channel of a main mix. This general process is described, for example, in J.-M. Jot, V. Larcher, and J.-M. Pernaux. "A comparative study of 3-D audio encoding and rendering techniques," Proc. AES 16th International Conference on Spatial Sound Reproduction (1999). Each object may be input to a pan, gains module 820, which can implement the panning algorithm and perform additional signal processing, such as adjusting gain levels for each object.

In some embodiments, system 800 (e.g., via modules 820) may assign to each virtual sound source an apparent distance relative to a position of a virtual listener from which the rendering engine may derive a per-source direct gain and a per-source room gain for each object. The direct and room gains may affect an audio signal power contributed by the virtual sound source to the main mix bus 840 and to the room send bus 830, respectively. A minimum distance parameter may be assigned to each virtual sound source and the direct gain and the room gain may roll off at different rates as distance increases beyond this minimum distance.

In some examples, the system 800 of FIG. 8 may be used for production of audio recordings and interactive audio applications targeting traditional two-channel frontal stereo loudspeaker playback systems. However, when applied in binaural or immersive 3D-audio systems enabling spatially diffuse distribution of simulated reverberation and reflections, the system 800 may not provide sufficiently convincing auditory localization cues when rendering a virtual sound source, especially one distant from a listener. This can be addressed by the inclusion of a clustered reflections rendering module shared among virtual sound sources 810, while supporting per-source control of a spatial distribution of reflections. It is desirable for such a module to incorporate a per-source early reflection processing algorithm, as well as dynamic control of early reflection parameters according to virtual sound source and listener positions.

In some embodiments, it may be desired to have a spatial audio processing model/system and method that may accurately reproduce position-dependent room acoustic cues without computationally complex rendering of individual early reflections for each virtual sound source or a detailed description of acoustic reflector geometry and physical properties.

A reflection processing model may dynamically account for positions of a listener and virtual sound sources in a real or virtual room/environment without associated physical and geometrical descriptions. Per-source clustered reflections panning and a perceptual model for a control of early reflection processing parameters may be efficiently implemented.

Figure 9:
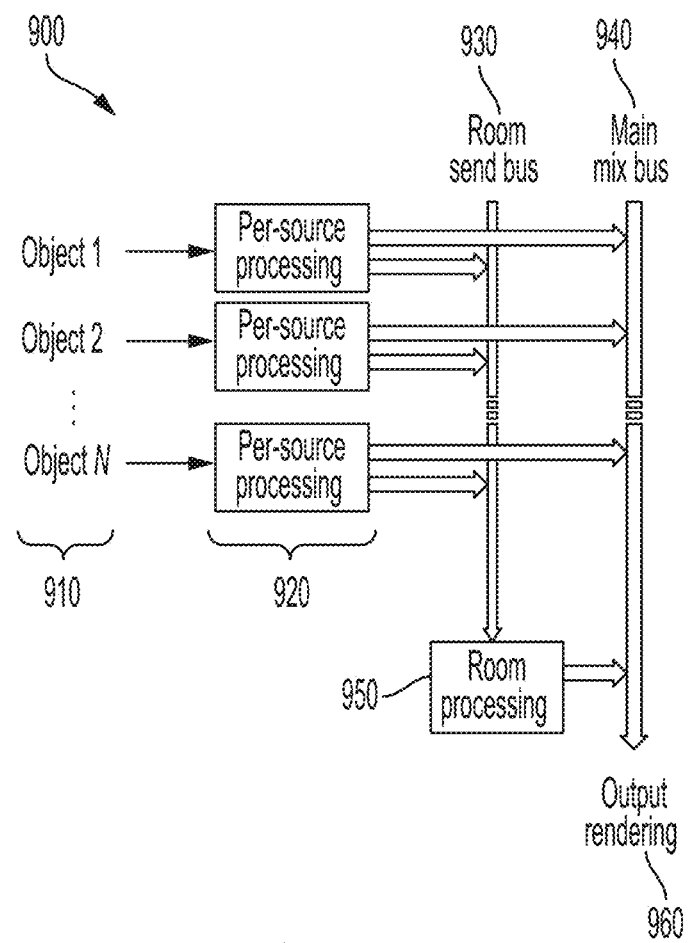
FIG. 9 illustrates an example audio mixing architecture for rendering multiple virtual sound sources in a virtual room, according to some embodiments.

FIG. 9 illustrates an audio mixing system 900 for rendering multiple virtual sound sources in a virtual room, according to some embodiments. For example, the system 900 may include a rendering engine for room acoustic simulation of multiple virtual sound sources 910 (e.g., objects 1 through N). Compared to system 800 described above, system 900 can include separate control of reverberation and reflections send channels for each virtual sound source. Each object may be input to a respective per-source processing module 920 and the room send bus 930 may feed a room processing module 950.

Figure 10:
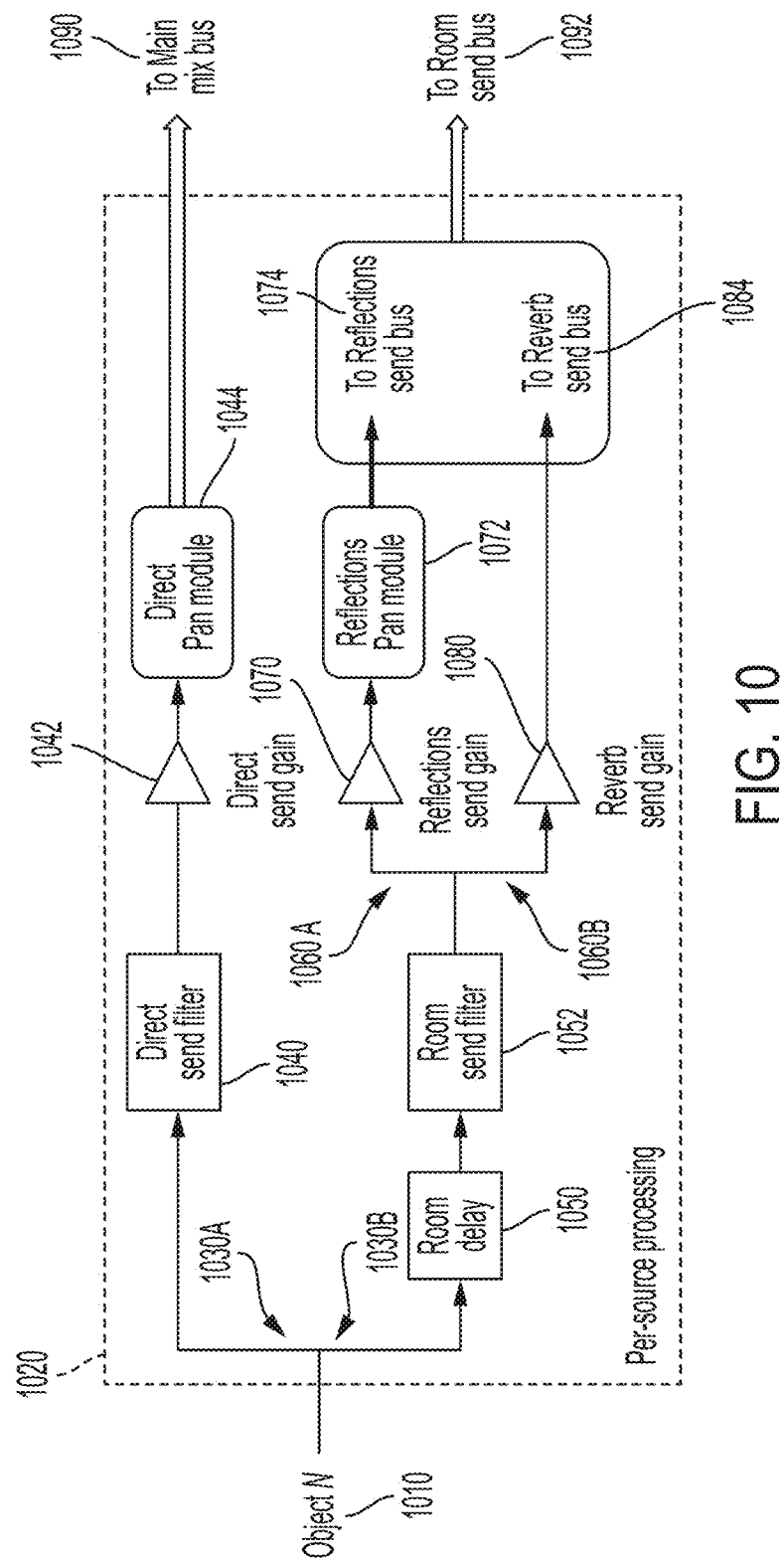
FIG. 10 illustrates an example per-source processing module, according to some embodiments.

FIG. 10 illustrates a per-source processing module 1020, according to some embodiments. Module 1020 can correspond to one or more of modules 920 shown in FIG. 9 and example system 900. The per-source processing module 1020 can perform processing specific to an individual source (e.g., 1010, which may correspond to one of sources 910) of the overall system (e.g., system 900). The per-source processing module may include a direct processing path (e.g., 1030A), and/or a room processing path (e.g., 1030B).

In some embodiments, individual direct and room filters may be applied for each sound source separately. Applying the filters separately may allow a more refined and accurate control over how each source is radiating sound towards a listener and into a surrounding environment. The use of filters, as opposed to broadband gains, may allow matching a desired sound radiation pattern as a function of frequency. This is beneficial because radiation properties may vary across sound source types and may be frequency dependent. An angle between a main acoustical axis of a sound source, and position of a listener may affect a sound pressure level perceived by the listener. Furthermore, source radiation characteristics may affect a diffuse power average of the source.

In some embodiments, frequency dependent filters may be implemented using a dual-shelving approach disclosed in U.S. Pat. Appl. No. 62/678,259 entitled "INDEX SCHEMING FOR FILTER PARAMETERS" the contents of which are incorporated by reference in its entirety. In some embodiments, frequency dependent filters may be applied in a frequency domain and/or using finite impulse response filters.

As shown in the example, the direct processing path may include a direct send filter 1040 followed by a direct pan module 1044. The direct send filter 1040 may model one or more acoustic effects, such as one or more of sound source directivity, distance, and/or orientation. Direct pan module 1044 can spatialize an audio signal to correspond to an apparent position in an environment (e.g., a 3D location in a virtual environment, such as an XR environment). The direct pan module 1044 may be amplitude and/or intensity based, and may be dependent on a geometry of a loudspeaker array. In some embodiments, the direct processing path may include a direct send gain 1042 along with the direct send filter and the direct pan module. Direct pan module 1044 can output to a main mix bus 1090, which can correspond to main mix bus 940 described above with respect to example system 900.

In some embodiments, the room processing path comprises a room delay 1050 and a room send filter 1052, followed by a reflections path (e.g., 1060A), and a reverberation path (e.g., 1060B). The room send filter may be used to model an effect of sound source directivity on a signal going to the reflections and reverberation paths. The reflections path may comprise a reflections send gain 1070, and may send the signal to a reflections send bus 1074 via a reflections pan module 1072. The reflections pan module 1072 may be analogous to the direct pan module 1044, in that it can spatialize an audio signal, but can operate on reflections instead of direct signal. The reverberation path 1060B may comprise a reverberation gain 1080, and may send the signal to a reverberation send bus 1084. The reflections send bus 1074 and the reverberations send bus 1084 may be grouped into a room send bus 1092, which can correspond to room send bus 930 described above with respect to example system 900.

Figure 11:
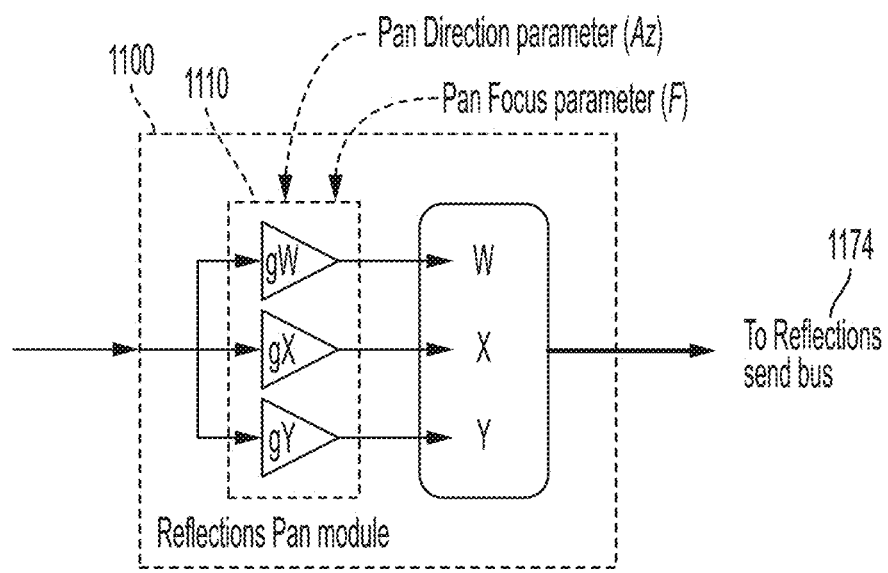
FIG. 11 illustrates an example per-source reflections pan module, according to some embodiments.

FIG. 11 illustrates an example of a per-source reflections pan module 1100, which may correspond to reflections pan module 1072 described above, according to some embodiments. As shown in the figure, an input signal may be encoded into a three-channel ambisonic B-format signal, for example, as described in J.-M. Jot, V. Larcher, and J.-M. Pernaux. "A comparative study of 3-D audio encoding and rendering techniques," Proc. AES 16th International Conference on Spatial Sound Reproduction (1999). Encoding coefficients 1110 can be calculated according to Equations 1-3.

$$gW=\sqrt{1-k*k} \qquad \text{Equation 1}$$

$$gX=k*\cos(Az) \qquad \text{Equation 2}$$

$$gY=k*\sin(Az) \qquad \text{Equation 3}$$

In Equations 1-3, k may be calculated as $0.5*\sqrt{3}*F$, where F is a spatial focus parameter with values between [0, ⅔], and Az is an angle in degrees between [0, 360]. An encoder may encode the input signal into the three-channel ambisonic B-format signal.

Az may be an azimuth angle defined by projection of a principal direction of arrival of reflections into a head-relative horizontal plane (e.g., a plane perpendicular to a listener head's "up" vector and containing the listener's ears). The spatial focus parameter F may indicate a spatial concentration of reflected signal energy arriving at the listener. When F is zero, spatial distribution of reflected energy arrivals may be uniform around the listener. As F increases, spatial distribution may be more and more concentrated around a principal direction determined by the azimuth angle Az. The maximum theoretical value of F may be 1.0, indicating that all energy is arriving from the principal direction determined by azimuth angle Az.

In an embodiment of the invention, the spatial focus parameter F may be defined as the magnitude of the Gerzon energy vector, described for instance in J.-M. Jot, V. Larcher, and J.-M. Pernaux. "A comparative study of 3-D audio encoding and rendering techniques," Proc. AES 16th International Conference on Spatial Sound Reproduction (1999).

Outputs of the reflections pan module 1100 can be provided to a reflections send bus 1174, which may correspond to reflections send bus 1074 described above with respect to FIG. 10 and example processing module 1020.

Figure 12:
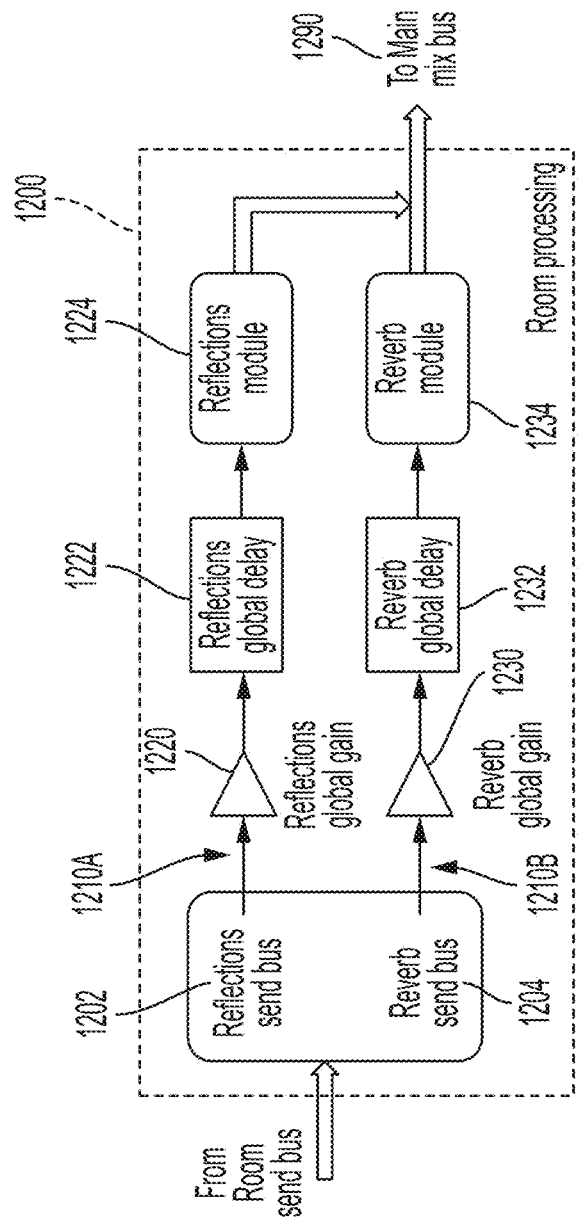
FIG. 12 illustrates an example room processing algorithm, according to some embodiments.

FIG. 12 illustrates an example room processing module 1200, according to some embodiments. Room processing module 1200 can correspond to room processing module 950 described above with respect to FIG. 9 and example system 900. As shown in FIG. 9, the room processing module 1200 may comprise a reflections processing path 1210A, and/or a reverberation processing path 1210B.

The reflections processing path 1210A may receive a signal from a reflections send bus 1202 (which may correspond to reflections send bus 1074 described above), and output a signal into the main mix bus 1290 (which may correspond to main mix bus 940 described above). The reflections processing path 1210A may comprise a reflections global gain 1220, a reflections global delay 1222, and/or a reflections module 1224 which may simulate/render reflections.

The reverberation processing path 1210B may receive a signal from a reverberation send bus 1204 (which may correspond to reverberation send bus 1084 described above), and output a signal into the main mix bus 1290. The reverberation processing path 1210B may include a reverberation global gain 1230, a reverberation global delay 1232, and/or a reverberation module 1234.

Figure 13:
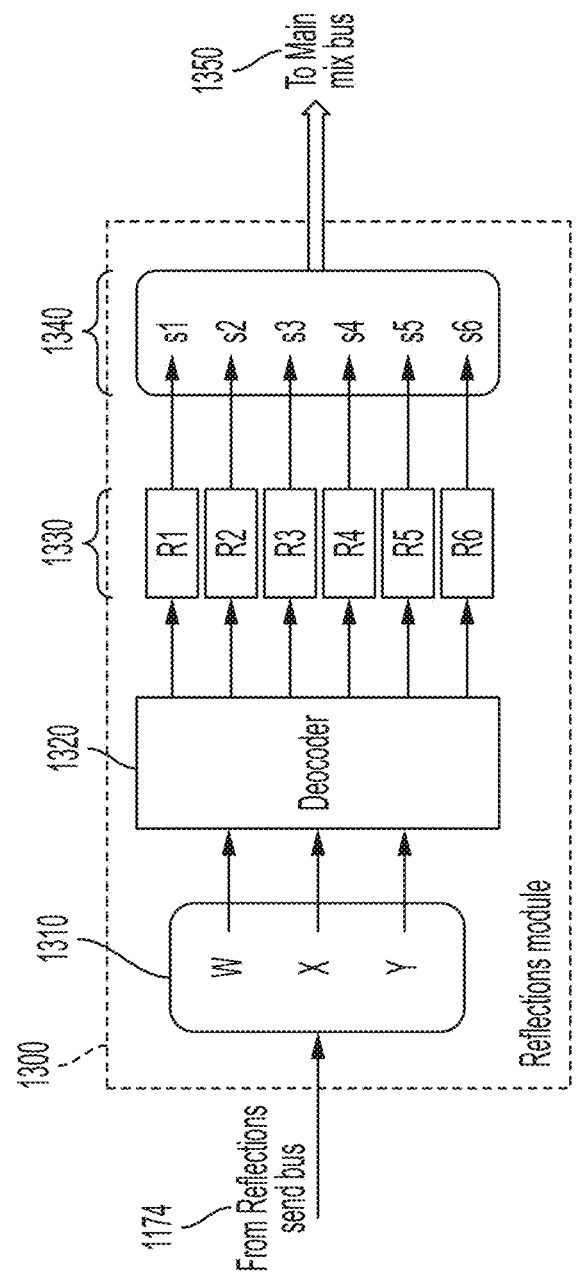
FIG. 13 illustrates an example reflections module, according to some embodiments.

FIG. 13 illustrates an example reflections module 1300, according to some embodiments. Inputs 1310 of the reflections module can be output by reflections pan module 1100, such as described above, and presented to reflections module 1300 via the reflections send bus 1174. The reflections send bus may carry a 3-channel ambisonic B-format signal combining contributions from all virtual sound sources (e.g., sound sources 910 (objects 1 to N) described above with respect to FIG. 9). In the example shown, the three channels, denoted (W, X, Y), are fed to an ambisonic decoder 1320. According to the example, the ambisonic decoder produces six output signals which respectively feed six mono in/out elementary reflection modules 1330 (R1 through R6), producing a set of six reflection output signals 1340 (s1 through s6). (While the example shows six signals and reflection modules, any suitable number may be used.) The reflection output signals 1340 are presented to the main mix bus 1350, which may correspond to main mix bus 940 described above.

Figure 14:
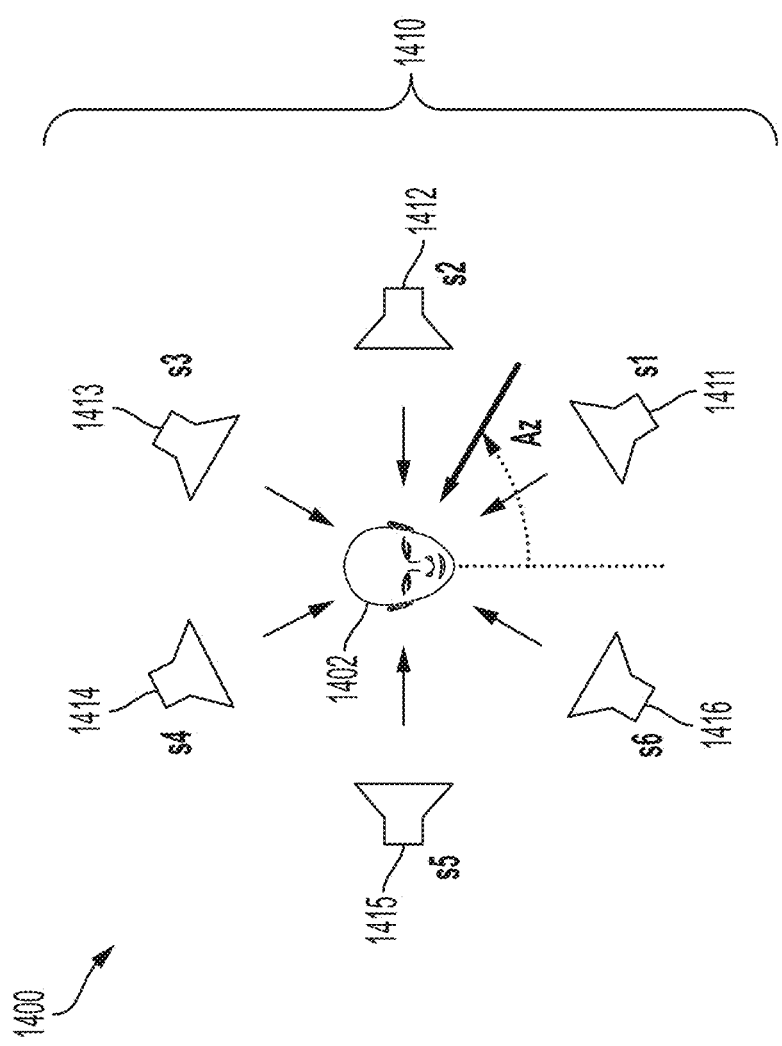
FIG. 14 illustrates an example spatial distribution of apparent directions of arrival of reflections, according to some embodiments.

FIG. 14 illustrates a spatial distribution 1400 of apparent directions of arrival of reflections, as detected by a listener 1402, according to some embodiments. For example, the reflections shown can be those produced by the reflections module 1300 described above, e.g., for a sound source assigned particular values of the reflections pan parameters Az and F described above with respect to FIG. 11.

As illustrated in FIG. 14, an effect of the reflections module 1300 combined with the reflections pan module 1100 is to produce a series of reflections, each of which may arrive at a different time (e.g., as illustrated in model 600) and from each of the virtual loudspeaker directions 1410 (e.g., 1411 through 1416, which may correspond to reflection output signals s1 through s6 described above). An effect of the reflections pan module of 1100 combined with the ambisonic decoder 1320 is to adjust the relative amplitudes of the reflection output signals 1340 in order to produce, for the listener, a sensation that reflections emanate from a principal direction angle Az, with a spatial distribution determined by the setting of the spatial focus parameter F (e.g., more or less concentrated around that principal direction).

In some embodiments, the reflections principal direction angle Az coincides, for each source, with an apparent direction of arrival of the direct path, which can be controlled for each source by direct pan module 1020. Simulated reflections may emphasize a perception of directional position of the virtual sound source perceived by the listener.

In some embodiments, the main mix bus 940 and the direct pan module 1020 may enable three-dimensional reproduction of sound directions. In these embodiments, the reflections principal direction angle Az may coincide with the projection of the apparent direction onto the plane where the reflections principal angle Az is measured.

Figure 15:
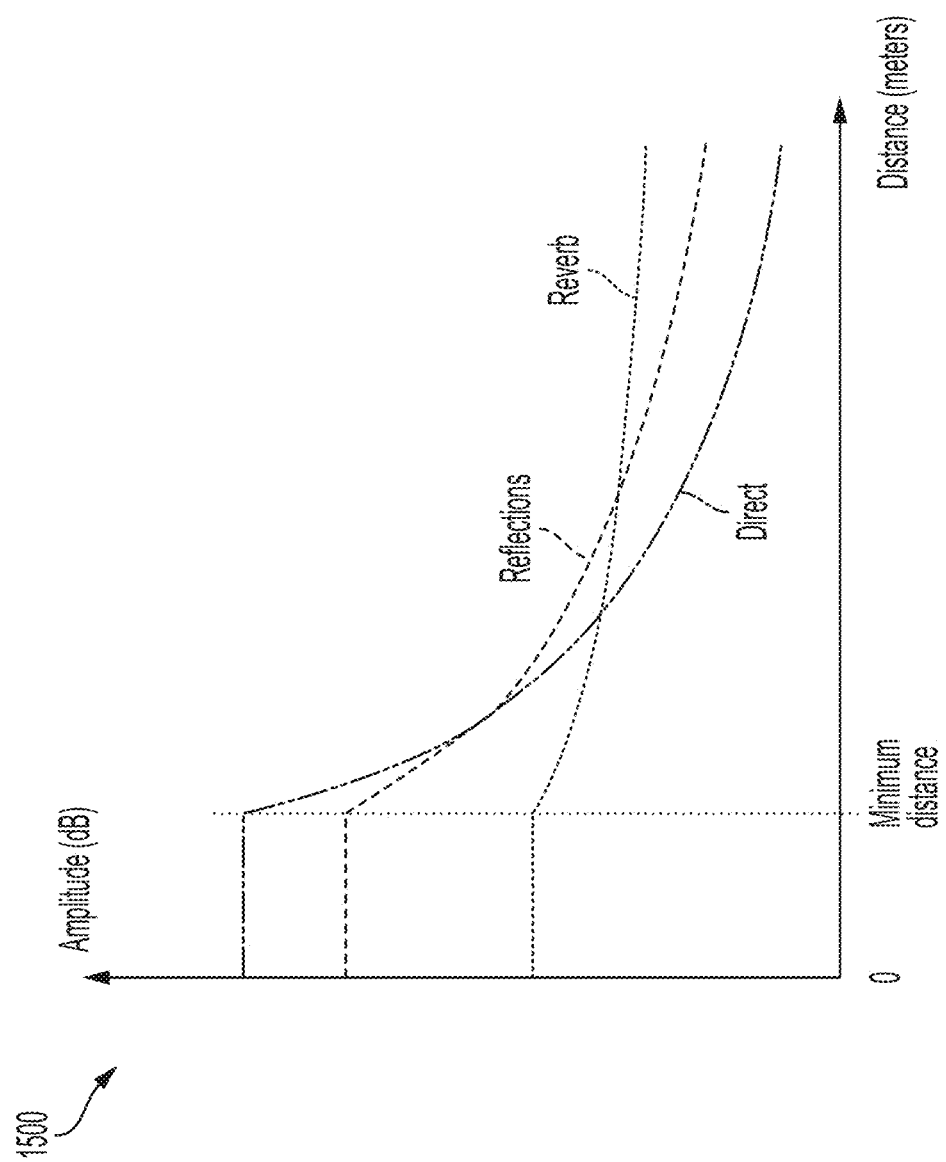
FIG. 15 illustrates examples of direct gain, reflections gain, and reverberation gain as functions of distance, according to some embodiments.

FIG. 15 illustrates a model 1500 of example direct gain, reflections gain, and reverberation gain as functions of distance (e.g., to a listener), according to some embodiments. Model 1500 illustrates an example of a variation of direct, reflections, and reverberation send gains, for example, shown in FIG. 10, relative to source distance. As shown in the figure, it may be that a direct sound, its reflections, and its reverberations may have significantly different falloff curves with respect to distance. In some cases, per-source processing such as described above may allow realizing a faster distance-based roll-off for the reflections than for the reverberation. Psychoacoustically, this may enable robust directional perception and distance perception, especially for distant sources.

Figure 16:
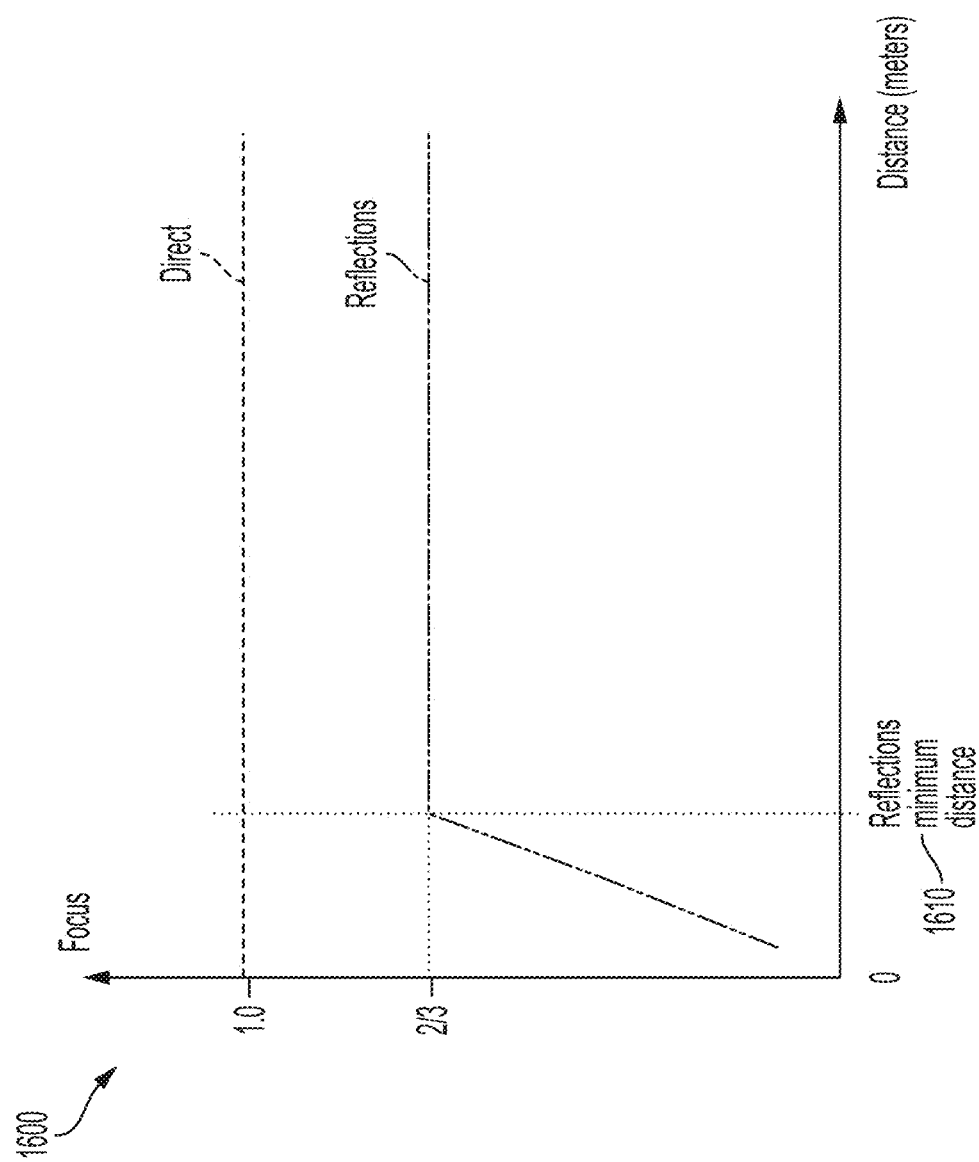
FIG. 16 illustrates example relationships between distance and spatial focus, according to some embodiments.

FIG. 16 illustrates an example model 1600 of spatial focus versus source distance for direct and reflections components, according to some embodiments. In this example, the direct pan module 1020 is configured to produce a maximum spatial concentration of the direct path component in the direction of the sound source, regardless of its distance. A reflections spatial focus parameter F, on the other hand, may be set to an example value of ⅔ to reinforce directional perception, in a realistic manner, for all distances larger than a limit distance (e.g., reflections minimum distance 1610). As illustrated by the example model 1600, the reflections spatial focus parameter value decreases towards zero as the source approaches the listener.

Figure 17:
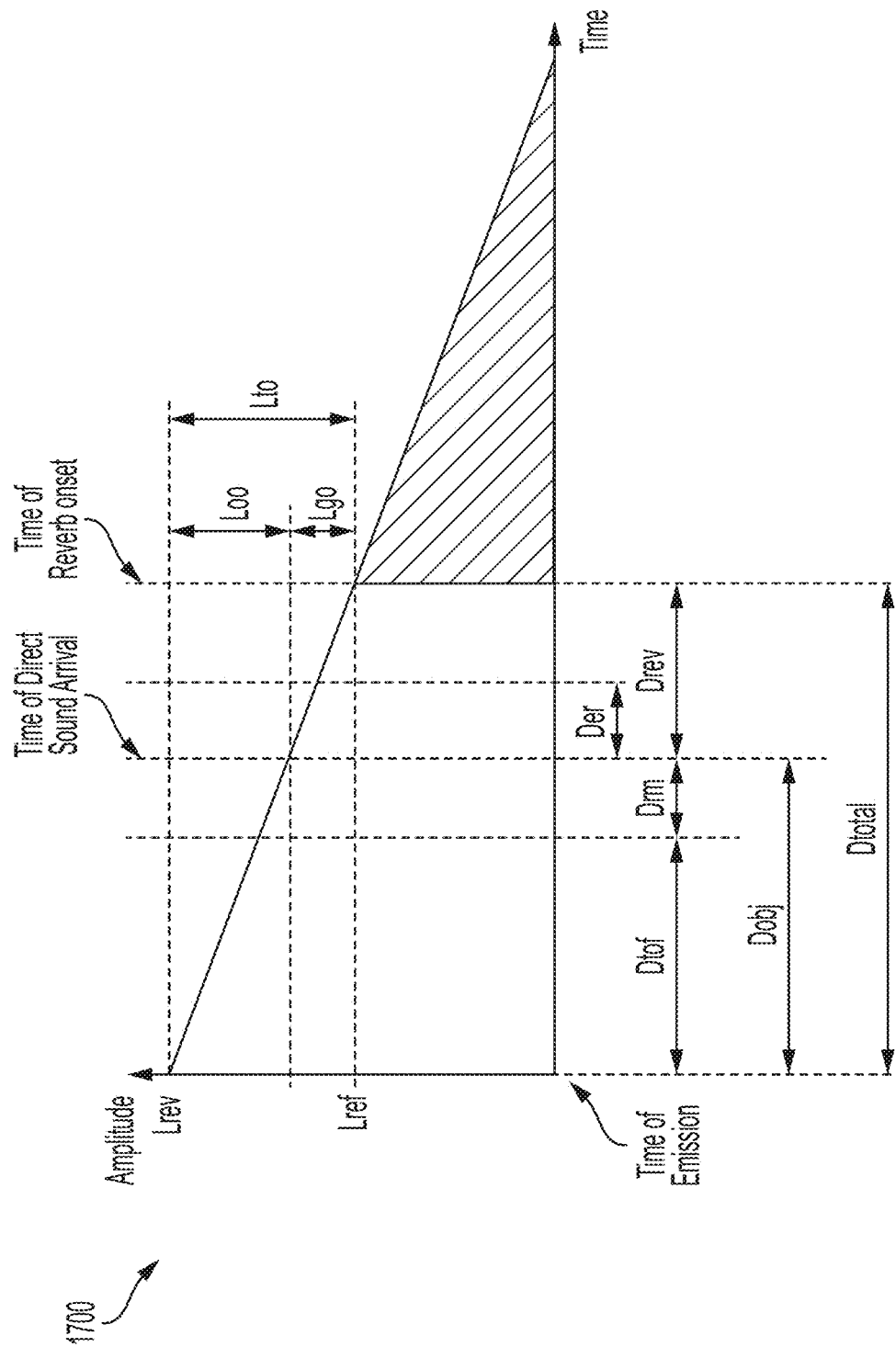
FIG. 17 illustrates example relationships between time and signal amplitude, according to some embodiments.

FIG. 17 shows an example model 1700 of the amplitude of an audio signal as a function of time. As described above, a reflections processing path (e.g., 1210A) may receive a signal from a reflections send bus, and output a signal onto a main mix bus. The reflections processing path may include a reflections global gain (e.g., 1220), a reflections global delay (e.g., 1222) to control a parameter Der as shown in model 1700, and/or a reflections module (e.g., 1224), such as described above.

As described above, a reverberation processing path (e.g., 1210B) may receive a signal from a reverberation send bus, and output a signal into the main mix bus. The reverberation processing path 1210B may include a reverberation global gain (e.g., 1230) to control a parameter Lgo as shown in model 1700, a reverberation global delay (e.g., 1232) to control a parameter Drev as shown in model 1700, and/or a reverberation module (e.g., 1234). The processing blocks within the reverberation processing path may be implemented in any suitable order. Examples of reverberation modules are described in U.S. Pat. Appl. No. 62/685,235 entitled "REVERBERATION GAIN NORMALIZATION" and U.S. Pat. Appl. No. 62/684,086 entitled "LOW-FREQUENCY INTERCHANNEL COHERENCE CONTROL", the contents of each of which are hereby incorporated by reference in their entirety.

Model 1700 of FIG. 17 illustrates how per-source parameters, including distance and reverberation delay, may be taken into account to dynamically adjust reverberation delay and level, according to some embodiments. In the figure, Dtof denotes a delay due to time of flight for a given object: Dtof=ObjDist/c, where ObjDist is a object distance from a center of a head of a listener and c is the speed of sound in air. Drm denotes a per object room delay. Dobj denotes a total per object delay: Dobj=Dtof+Drm. Der denotes a global early reflection delay. Drev denotes a global reverb delay. Dtotal denotes a total delay for a given object: Dtotal=Dobj+Dglobal.

Lref denotes a level of a reverb for Dtotal=0. Lgo denotes a global level offset due to global delays, which may be computed according to Equation 10, where T60 is the reverberation time of a reverberation algorithm. Loo denotes a per object level offset due to the global delays, which may be computed according to Equation 11. Lto denotes a total level offset for a given object and may be computed according Equation 12 (assuming dB values).

$$Lgo = Dglobal/T60*60 \text{ (dB)} \qquad \text{Equation 10}$$

$$Loo = Dobj/T60*60 \text{ (dB)} \qquad \text{Equation 11}$$

$$Lto = Lgo + Loo \qquad \text{Equation 12}$$

In some embodiments, a reverb level is calibrated independent of object position, reverb time, and other user controllable parameters. Accordingly, Lrev may be an extrapolated level of decaying reverb at an initial time of sound emission. Lrev may be the same quantity as the Reverb Initial Power (RIP) defined in U.S. Pat. Appl. No. 62/685,235 entitled "REVERBERATION GAIN NOR- MALIZATION" the contents of which is hereby incorporated by reference in its entirety. Lrev may be computed according to Equation 13.

$$L_{rev}=L_{ref}+L_{to} \qquad \text{Equation 13}$$

In some embodiments, T60 may be a function of frequency. Therefore, Lgo, Loo, and consequently Lto are frequency dependent.

Figure 18:
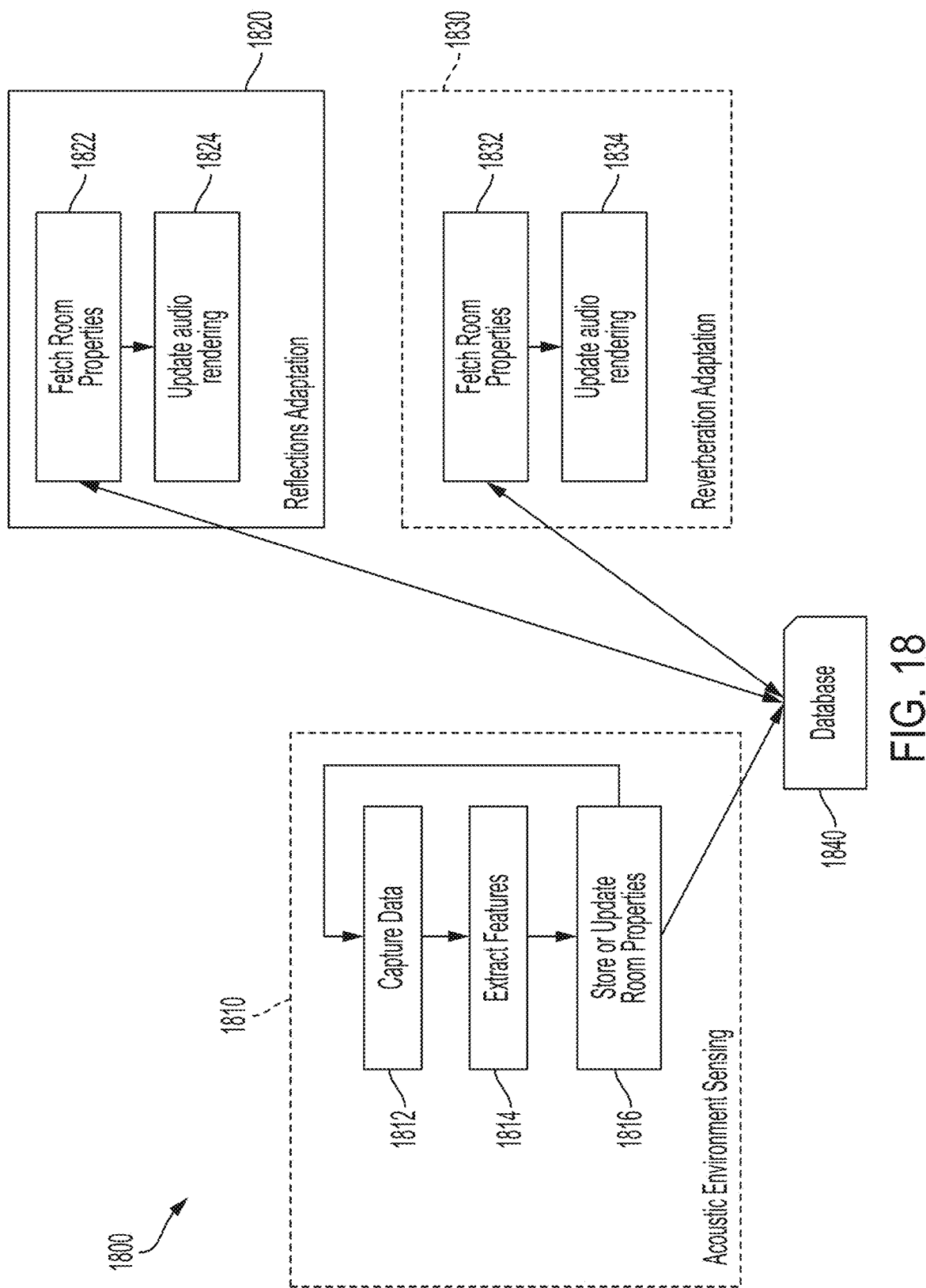
FIG. 18 illustrates an example system for processing spatial audio, according to some embodiments.

FIG. 18 illustrates an example system 1800 for determining spatial audio properties based on an acoustic environment. Example system 1800 can be used to determine spatial audio properties for reflections and/or reverberation such as described above. As examples, such properties may include a volume of a room; reverberation time as a function of frequency; a position of a listener with respect to the room; the presence of objects (e.g., sound-dampening objects) in the room; surface materials; or other suitable properties. In some examples, these spatial audio properties may be retrieved locally by capturing a single impulse response with a microphone and loudspeaker freely positioned in a local environment, or may be derived adaptively by continuously monitoring and analyzing sounds captured by a mobile device microphone. In some examples, such as where an acoustic environment can be sensed via sensors of an XR system (e.g., an augmented reality system including one or more of wearable head unit 100, handheld controller 200, and auxiliary unit 300 described above), a user's location can be used to present audio reflections and reverberations that correspond to an environment presented (e.g., via a display) to the user.

In example system 1800, an acoustic environment sensing module 1810 identifies spatial audio properties of an acoustic environment, such as described above. In some examples, acoustic environment sensing module 1810 can capture data (stage 1812) corresponding to an acoustic environment. For example, the data captured at stage 1812 could include audio data from one or more microphones; camera data from a camera such as an RGB camera or depth camera; LIDAR data, sonar data; radar data; GPS data; or other suitable data that may convey information about the acoustic environment. In some instances, the data captured at stage 1812 can include data related to the user, such as the user's position or orientation with respect to the acoustic environment. The data captured at stage 1812 can be captured via one or more sensors of a wearable device, such as wearable head unit 100 described above.

In some embodiments, a local environment in which the head-mounted display device is may include one or more microphones. In some embodiments, one or more microphones may be employed, and may be mobile device mounted or environment positioned or both. Benefits of such arrangements may include gathering directional information about reverberation of a room, or mitigating poor signal quality of any one microphone within the one or more microphones. Signal quality may be poor on a given microphone due for instance to occlusion, overloading, wind noise, transducer damage, and the like.

At stage 1814 of module 1810, features can be extracted from the data captured at stage 1812. For example, the dimensions of a room can be determined from sensor data such as camera data, LIDAR data, sonar data, etc. The features extracted at stage 1814 can be used to determine one or more acoustic properties of the room—for example, frequency-dependent reverberation times—and these properties can be stored at stage 1816 and associated with the current acoustic environment.

In some examples, module 1810 can communicate with a database 1840 to store and retrieve acoustic properties for an acoustic environment. In some embodiments, the database may be stored locally on a device's memory. In some embodiments, the database may be stored online as a cloud based service. The database may assign a geographical location to the room properties for easy access at a later time based on the location of a listener. In some embodiments, the database may contain additional information to identify the location of a listener and/or determine reverberation properties in the database that are a close approximation of the listener's environment properties. For instance, room properties may be categorized by room types, so a set of parameters can be used as soon as it is identified that the listener is in a known type of room (e.g. a bedroom, or a living room) even if the absolute geographical location may not be known.

Storing of reverberation properties into a database may be related to U.S. Pat. Appl. No. 62/573,448 entitled "PERSISTENT WORLD MODEL SUPPORTING AUGMENTED REALITY AND INCLUDING AUDIO COMPONENT" the contents of which are hereby incorporated by reference in its entirety.

In some examples, system 1800 can include a reflections adaptation module 1820 for retrieving acoustic properties for a room, and applying those properties to audio reflections (for example, audio reflections presented via headphones, or via speakers to a user of a wearable head unit 100). At stage 1822, a user's current acoustic environment can be determined. For example, GPS data can indicate a user's location in GPS coordinates, which can in turn indicate the user's current acoustic environment (e.g., a room located at those GPS coordinates). As another example, camera data in combination with optical recognition software can be used to identify a user's current environment. Reflections adaptation module 1820 can then communicate with database 1840 to retrieve acoustic properties associated with the determined environment, and those acoustic properties can be used at stage 1824 to update an audio rendering accordingly. That is, acoustic properties relating to reflections (e.g., directivity patterns or falloff curves, such as described above) can be applied to reflection audio signals presented to the user, such that the reflection audio signals presented incorporate those acoustic properties.

Similarly, in some examples, system 1800 can include a reflections adaptation module 1830 for retrieving acoustic properties for a room, and applying those properties to audio reverberations (for example, audio reflections presented via headphones, or via speakers to a user of a wearable head unit 100). The acoustic properties of interest for reverberations may differ from those of interest for reflections, such as described above (e.g., at table 700 with respect to FIG. 7). At stage 1832, as above, a user's current acoustic environment can be determined. For example, GPS data can indicate a user's location in GPS coordinates, which can in turn indicate the user's current acoustic environment (e.g., a room located at those GPS coordinates). As another example, camera data in combination with optical recognition software can be used to identify a user's current environment. Reverberation adaptation module 1830 can then communicate with database 1840 to retrieve acoustic properties associated with the determined environment, and those acoustic properties can be used at stage 1824 to update an audio rendering accordingly. That is, acoustic properties relating to reverberation (e.g., reverb decay times, such as described above) can be applied to reverberation audio signals presented to the user, such that the reverberation audio signals presented incorporate those acoustic properties.

With respect to the systems and methods described above, elements of the systems and methods can be implemented by one or more computer processors (e.g., CPUs or DSPs) as appropriate. The disclosure is not limited to any particular configuration of computer hardware, including computer processors, used to implement these elements. In some cases, multiple computer systems can be employed to implement the systems and methods described above. For example, a first computer processor (e.g., a processor of a wearable device coupled to a microphone) can be utilized to receive input microphone signals, and perform initial processing of those signals (e.g., signal conditioning and/or segmentation, such as described above). A second (and perhaps more computationally powerful) processor can then be utilized to perform more computationally intensive processing, such as determining probability values associated with speech segments of those signals. Another computer device, such as a cloud server, can host a speech recognition engine, to which input signals are ultimately provided. Other suitable configurations will be apparent and are within the scope of the disclosure.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method comprising:
   determining, based on a location of a sound source and further based on an acoustic property of a virtual environment, an intermediate audio signal, the intermediate audio signal corresponding to a reflection of an input audio signal by a surface of the virtual environment, wherein:
      said determining the intermediate audio signal comprises encoding the input audio signal based on the location of the sound source, and
      the intermediate audio signal is associated with a first plurality of channels;
   associating the intermediate audio signal with a bus, wherein the bus is associated with the first plurality of channels; and
   presenting, via the bus, an output audio signal to a listener, wherein:
      the output audio signal is determined via decoding the intermediate audio signal to produce a decoded intermediate audio signal, and
      the decoded intermediate audio signal is associated with a second plurality of channels, different from the first plurality of channels.

2. The method of claim 1, wherein the acoustic property of the virtual environment is determined via one or more sensors.

3. The method of claim 2, wherein the one or more sensors comprise one or more microphones.

4. The method of claim 2, wherein the one or more sensors comprise one or more cameras.

5. The method of claim 2, wherein:
   the one or more sensors are associated with a wearable head device configured to be worn by the listener, and the output audio signal is presented to the listener via one or more speakers associated with the wearable head device.

6. The method of claim 1, further comprising displaying to the listener, concurrently with the presentation of the output audio signal, a view of the virtual environment.

7. The method of claim 1, further comprising retrieving the acoustic property from a database, wherein the acoustic property is determined via one or more sensors.

8. The method of claim 7, wherein the retrieving the acoustic property comprises:
   determining, based on an output of the one or more sensors, a location of the listener; and
   identifying the acoustic property based on the location of the listener.

9. The method of claim 1, wherein the intermediate audio signal is decoded via an ambisonics decoder.

10. The method of claim 1, wherein the acoustic property is determined via a first device, and the intermediate audio signal is determined via a second device different from the first device.

11. The method of claim 1, wherein:
    the virtual environment is part of a mixed reality environment,
    the surface of the virtual reality environment comprises a surface of the mixed reality environment, and
    the location of the sound source comprises a location of the mixed reality environment.

12. A system, comprising:
    one or more speakers; and
    one or more processors configured to perform a method comprising:
       determining, based on a location of a sound source and further based on an acoustic property of a virtual environment, an intermediate audio signal, the intermediate audio signal corresponding to a reflection of an input audio signal by a surface of the virtual environment, wherein:
          said determining the intermediate audio signal comprises encoding the input audio signal based on the location of the sound source, and
          the intermediate audio signal is associated with a first plurality of channels;
       associating the intermediate audio signal with a bus, wherein the bus is associated with the first plurality of channels; and
       presenting, via the bus and the one or more speakers, an output audio signal to a listener, wherein:
          the output audio signal is determined via decoding the intermediate audio signal to produce a decoded intermediate audio signal, and
          the decoded intermediate audio signal is associated with a second plurality of channels, different from the first plurality of channels.

13. The system of claim 12, further comprising one or more sensors, wherein the acoustic property of the virtual environment is determined via the one or more sensors.

14. The system of claim 13, wherein the one or more sensors comprise one or more microphones.

15. The system of claim 13, wherein the one or more sensors comprise one or more cameras.

16. The system of claim 13, wherein:
    the one or more sensors and the one or more speakers are associated with a wearable head device configured to be worn by the listener.

17. The system of claim 12, further comprising a display, wherein the method further comprises displaying to the listener, via the display and concurrently with the presentation of the output audio signal, a view of the virtual environment.

18. The system of claim 12, wherein the acoustic property is determined via a first device, and the intermediate audio signal is determined via a second device different from the first device.

19. The system of claim 12, wherein:
the virtual environment is part of a mixed reality environment,
the surface of the virtual reality environment comprises a surface of the mixed reality environment, and
the location of the sound source comprises a location of the mixed reality environment.

20. A non-transitory computer-readable medium storing instructions that, when executed by one or more processors, cause the one or more processors to perform a method comprising:
determining, based on a location of a sound source and further based on an acoustic property of a virtual environment, an intermediate audio signal, the intermediate audio signal corresponding to a reflection of an input audio signal by a surface of the virtual environment, wherein:
said determining the intermediate audio signal comprises encoding the input audio signal based on the location of the sound source, and
the intermediate audio signal is associated with a first plurality of channels;
associating the intermediate audio signal with a bus, wherein the bus is associated with the first plurality of channels; and
presenting, via the bus, an output audio signal to a listener, wherein:
the output audio signal is determined via decoding the intermediate audio signal to produce a decoded intermediate audio signal, and
the decoded intermediate audio signal is associated with a second plurality of channels, different from the first plurality of channels.

* * * * *